US012762979B2

(12) United States Patent
Won et al.

(10) Patent No.: US 12,762,979 B2
(45) Date of Patent: Oct. 13, 2026

(54) STEREOSCOPIC IMAGE DISPLAY DEVICE AND METHOD OF DRIVING THE SAME, AND ELECTRONIC DEVICE INCLUDING THE STEREOSCOPIC IMAGE DISPLAY DEVICE

(71) Applicant: SAMSUNG DISPLAY CO., LTD., Yongin-si (KR)

(72) Inventors: Byeong Hee Won, Yongin-si (KR); Young Chan Kim, Yongin-si (KR); Beom Shik Kim, Yongin-si (KR); Su Bin Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/081,562

(22) Filed: Mar. 17, 2025

(65) Prior Publication Data

US 2026/0038398 A1 Feb. 5, 2026

(30) Foreign Application Priority Data

Aug. 1, 2024 (KR) ........................ 10-2024-0102287

(51) Int. Cl.
*G09G 3/00* (2006.01)
*G02B 30/27* (2020.01)
(Continued)

(52) U.S. Cl.
CPC ............. *G09G 3/003* (2013.01); *G02B 30/27* (2020.01); *G06F 3/013* (2013.01); *H04N 13/305* (2018.05);
(Continued)

(58) Field of Classification Search
CPC ............. G09G 3/003; G09G 2320/068; G09G 2354/00; G02B 30/27; G06F 3/013; H04N 13/305; H04N 13/383
See application file for complete search history.

(56) References Cited

U.S. PATENT DOCUMENTS 6,535,256 B1 * 3/2003 Ishihara ............ G02F 1/133621 349/5
9,772,500 B2 * 9/2017 Wu .................. G02F 1/134309
(Continued)

FOREIGN PATENT DOCUMENTS

CN 1892288 A * 1/2007 ........... H04N 13/161
CN 102122074 B * 10/2013 ............ G02B 30/27
(Continued)

*Primary Examiner* — William Lu
(74) *Attorney, Agent, or Firm* — F. CHAU & ASSOCIATES, LLC

(57) ABSTRACT

A stereoscopic image display device includes a display panel configured to display an image and an optical member that refracts image display light emitted in the display area of the display panel, outputting it as stereoscopic image display light. A plurality of image sensors arranged in the display area capture front-side image data. A main driver circuit analyzes the front-side image data to track a user's location and/or the user's right and left eye positions and controls pixels in the display area to display right-eye and left-eye image data. The main driver circuit further adjusts the viewing points of the right-eye and left-eye image data based on the tracked user's location and/or eye positions and drives the pixels to display a stereoscopic image aligned with the adjusted viewing points.

20 Claims, 13 Drawing Sheets

(51) Int. Cl.
*G06F 3/01* (2006.01)
*H04N 13/305* (2018.01)
*H04N 13/383* (2018.01)

(52) U.S. Cl.
CPC ..... *H04N 13/383* (2018.05); *G09G 2320/068* (2013.01); *G09G 2354/00* (2013.01)

(56) References Cited

U.S. PATENT DOCUMENTS

| | | | | |
|---|---|---|---|---|
| 10,129,529 | B2 * | 11/2018 | Lo | G02B 30/27 |
| 10,663,776 | B1 * | 5/2020 | Hopkin | G02B 6/0031 |
| 11,706,520 | B2 * | 7/2023 | Gummadi | H04M 1/0264 |
| 11,740,716 | B2 * | 8/2023 | Hwang | G06F 1/1626 345/173 |
| 2007/0002583 | A1 * | 1/2007 | Lee | G02B 3/0068 362/330 |
| 2007/0086090 | A1 * | 4/2007 | Wang | H04N 13/324 359/464 |
| 2010/0171697 | A1 * | 7/2010 | Son | H04N 13/279 348/E13.001 |
| 2010/0171862 | A1 * | 7/2010 | Culham | H04N 13/225 348/E5.022 |
| 2012/0092586 | A1 * | 4/2012 | He | G02F 1/29 349/200 |
| 2013/0128006 | A1 * | 5/2013 | Horikawa | H04N 13/128 348/49 |
| 2013/0135589 | A1 * | 5/2013 | Curtis | G03B 21/604 353/7 |
| 2013/0176407 | A1 * | 7/2013 | Curtis | G02B 27/104 348/52 |
| 2014/0085553 | A1 * | 3/2014 | Chen | G02F 1/133526 349/15 |
| 2015/0268478 | A1 * | 9/2015 | Kim | G02F 1/1347 349/15 |
| 2016/0018566 | A1 * | 1/2016 | Matsushima | G02B 27/62 359/619 |
| 2017/0285360 | A1 * | 10/2017 | Zha | G02B 30/25 |
| 2018/0235466 | A1 * | 8/2018 | Hakoshima | G06F 3/013 |
| 2021/0176383 | A1 * | 6/2021 | Kim | G06F 3/013 |
| 2021/0294460 | A1 * | 9/2021 | Yang | G06F 3/0412 |
| 2021/0397281 | A1 * | 12/2021 | Gupta | G02F 1/13336 |
| 2022/0116546 | A1 * | 4/2022 | Gummadi | G06T 13/80 |
| 2023/0030545 | A1 * | 2/2023 | Kim | H04M 1/0283 |
| 2023/0176442 | A1 * | 6/2023 | Kim | G02F 1/29 |
| 2023/0190096 | A1 * | 6/2023 | Lee | A61B 3/113 382/117 |
| 2023/0236435 | A1 * | 7/2023 | Huh | G02B 30/25 349/15 |
| 2023/0281885 | A1 * | 9/2023 | Park | G06V 10/94 345/156 |
| 2024/0340402 | A1 * | 10/2024 | Huh | H04N 13/305 |
| 2025/0005845 | A1 * | 1/2025 | Won | G06T 3/4053 |

FOREIGN PATENT DOCUMENTS

| | | | | | |
|---|---|---|---|---|---|
| ID | P202304619 | A | * | 6/2023 | |
| JP | 2007025337 | A | * | 2/2007 | |
| KR | 10-2021-0082316 | A | | 7/2021 | |
| KR | 10-2023-0111699 | A | | 7/2023 | |
| KR | 10-2024-0150666 | A | | 10/2024 | |
| KR | 10-2025-0004486 | A | | 1/2025 | |
| WO | WO-2020210361 | A1 | * | 10/2020 | G02B 30/10 |
| WO | WO-2021160325 | A1 | * | 8/2021 | B60K 35/81 |

* cited by examiner

STEREOSCOPIC IMAGE DISPLAY DEVICE AND METHOD OF DRIVING THE SAME, AND ELECTRONIC DEVICE INCLUDING THE STEREOSCOPIC IMAGE DISPLAY DEVICE

CROSS-REFERENCE TO RELATED APPLICATIONS

This application claims priority under 35 U.S.C. § 119 to Korean Patent Application No. 10-2024-0102287, filed on Aug. 1, 2024 in the Korean Intellectual Property Office, the disclosure of which is incorporated by reference herein in its entirety.

TECHNICAL FIELD

Embodiments of the present disclosure relates to a stereoscopic image display device and a method of driving the same, and an electronic device including the stereoscopic image display device.

DISCUSSION OF RELATED ART

Recently, three-dimensional (3D) image display devices and viewing-angle control display devices have been developed to provide divided images in the space in front of the display using optical members. Stereoscopic image display devices create three-dimensional (3D) experiences by separately displaying left-eye and right-eye images, leveraging binocular parallax. The technology can be categorized into stereoscopic and auto-stereoscopic techniques, which may require glasses or operate in a glasses-free manner. Stereoscopic techniques using glasses rely on polarized or shutter glasses to view separate left-eye and right-eye images. Auto-stereoscopic techniques employ optical members like parallax barriers or lenticular sheets to separate the optical axes of left-eye and right-eye images, enabling a glasses-free 3D experience.

Glasses-free 3D display devices track a user's location in real time using imaging elements, such as built-in cameras or image sensors. By detecting the user's position, the viewing points of left-eye and right-eye image data are dynamically adjusted, allowing stereoscopic images to be displayed accurately through pixels corresponding to each viewing point. This real-time adjustment can improve the viewer's 3D experience without the need for additional eyewear.

SUMMARY

Embodiments of the present disclosure provide a stereoscopic image display device having an improved design structure in which a built-in camera for tracking a user or the user's eyes, and/or an imaging element such as an image sensor, is disposed in an image display area of a display panel, and a method of driving the same.

Embodiments of the present disclosure also provide a stereoscopic image display device having an improved design structure in which a built-in camera and/or an imaging element is disposed on a rear side of pixels disposed in an image display area, and a method of driving the same.

According to an embodiment of the present disclosure, a stereoscopic image display device includes a display panel configured to display an image, an optical member, a plurality of image sensors, and a main driver circuit. The optical member is configured to refract an image display light emitted in a display area of the display panel and output the refracted image display light as a stereoscopic image display light. The plurality of image sensors is arranged in the display area and configured to capture front-side image data. The main driver circuit is configured to track a user's location and/or the user's right eye position and left eye position by analyzing the front-side image data, and control a plurality of pixels in the display area to display right-eye image data and left-eye image data. The main driver circuit is further configured to adjust viewing points of the right-eye image data and left-eye image data based on a result of tracking the user's location and/or the user's right eye position and left eye position, and drive the pixels to display a stereoscopic image corresponding to the adjusted viewing points.

According to an embodiment of the present disclosure, a stereoscopic image display device includes a display panel configured to display an image, an optical member, a plurality of image sensors, and a main driver circuit. The optical member is configured to refract an image display light emitted in a display area of the display panel and output the refracted image display light as a stereoscopic image display light. The plurality of image sensors is arranged in the display area and configured to capture front-side image data. The main driver circuit is configured to track a user's location and/or the user's right eye position and left eye position by analyzing the front-side image data, and control a plurality of pixels in the display area to display right-eye image data and left-eye image data. The image sensors are built into a substrate of the display panel, inserted into grooves formed in the substrate, or arranged on a rear surface of the substrate.

According to an embodiment of the present disclosure, a method of driving a stereoscopic image display device including a display panel configured to display an image and an optical member configured to refract an image display light emitted in a display area of the display panel and output the refracted image display light as a stereoscopic image display light includes capturing an image on a front side of the display panel through a plurality of image sensors arranged in the display area. The method further includes analyzing front-side image data generated through the image sensors to track a user's location and/or the user's right eye position and left eye position. The method further includes controlling a plurality of pixels in the display area to display a right-eye image and a left-eye image. Controlling the pixels in the display area includes adjusting viewing points of the right-eye image data and the left-eye image data based on a result of tracking the user's location and/or the user's right eye position and left eye position, and driving the pixels to display a stereoscopic image corresponding to the adjusted viewing points.

According to an embodiment of the present disclosure, an electronic device includes a stereoscopic image display device. The stereoscopic image display device includes a display panel configured to display an image, an optical member, a plurality of image sensors, and a main driver circuit. The optical member is configured to refract an image display light emitted in a display area of the display panel and output the refracted image display light as a stereoscopic image display light. The plurality of image sensors is arranged in the display area and configured to capture front-side image data. The main driver circuit is configured to track a user's location and/or the user's right eye position and left eye position, and control a plurality of pixels in the display area to display right-eye image data and left-eye image data. The main driver circuit is further configured to adjust viewing points of the right-eye image data and the left-eye image data based on a result of tracking the user's location or the user's right eye position and left eye position, and drive the pixels to display a stereoscopic image corresponding to the adjusted viewing points.

The terms "about" or "approximately" as used herein are inclusive of the stated value and means within an acceptable range of deviation for the particular value as determined by one of ordinary skill in the art, considering the measurement in question and the error associated with measurement of the particular quantity (e.g., the limitations of the measurement system).

According to embodiments of the present disclosure, by improving a design structure of a display panel so that a built-in camera and/or imaging elements such as image sensors are disposed in an image display area, it is possible to implement a stereoscopic image display device with a reduced bezel area or no bezel area.

In addition, by improving a design structure so that a built-in camera and/or imaging elements are disposed on the rear side of pixels arranged in an image display area, the imaging elements are not perceived by users, and thus, do not affect image display quality, thereby increasing user satisfaction.

BRIEF DESCRIPTION OF THE DRAWINGS

The above and other aspects and features of the present disclosure will become more apparent by describing in detail embodiments thereof with reference to the accompanying drawings.

DETAILED DESCRIPTION

Figure 1:
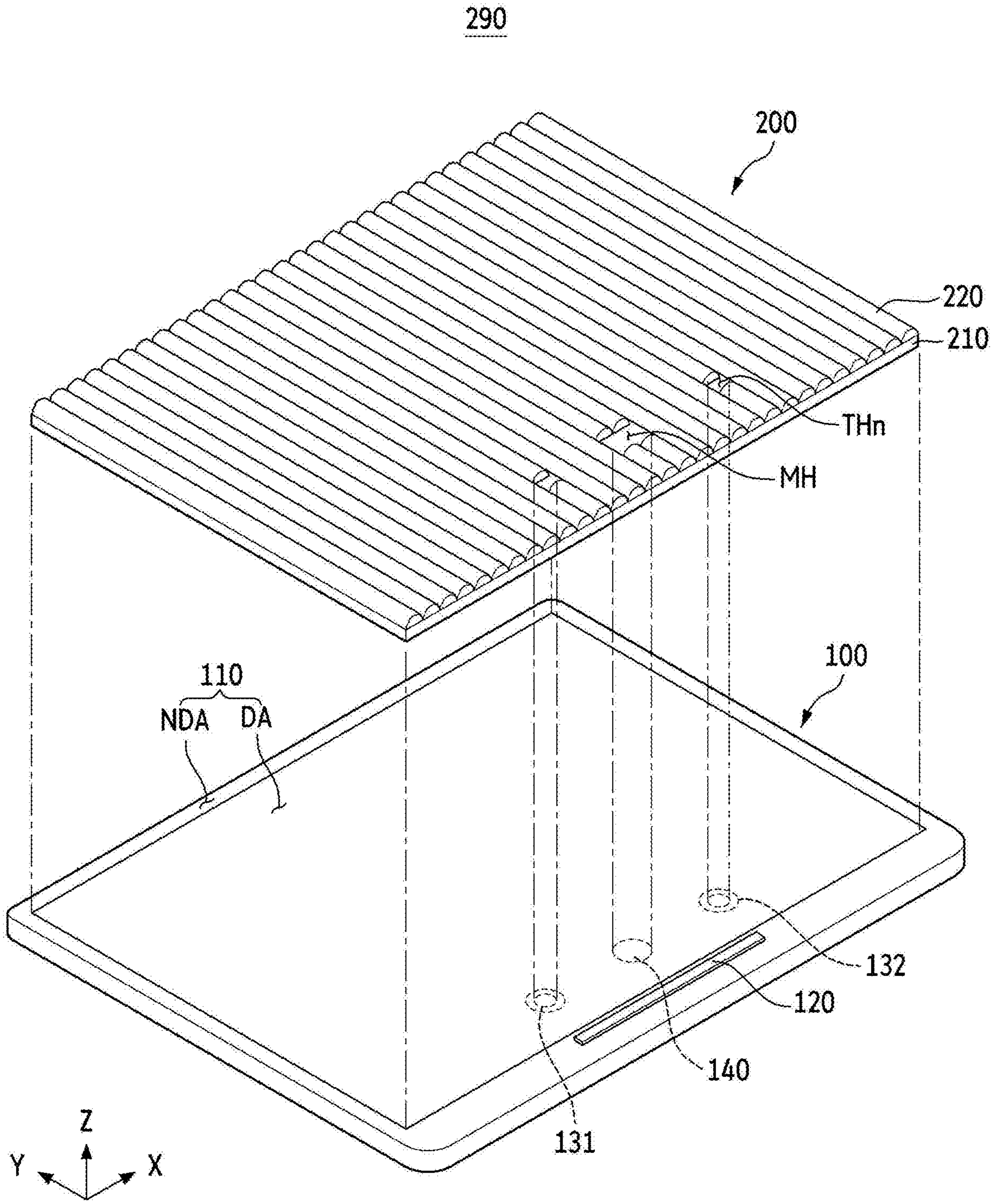
FIG. 1 is an exploded, perspective view showing a stereoscopic image display device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath", "below", "lower", "under", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

Embodiments of the present disclosure relate to a stereoscopic image display device, a method of driving the display device, and an electronic device incorporating the display device. Embodiments provide an improved three-dimensional (3D) viewing experience by integrating imaging elements such as, for example, built-in cameras or image sensors, directly within the image display area of a display panel. These imaging elements, which may be positioned behind or within grooves in the substrate of the display panel, allow real-time tracking of a user's eye positions and location without being visually obtrusive. Embodiments provide a reduced or bezel-free display while maintaining high image quality and user satisfaction.

According to embodiments, the imaging elements may capture front-side image data, which is analyzed by a main driver circuit to dynamically adjust the viewing points of left and right eye image data. As a result, the stereoscopic images displayed on the device may align properly with the user's eyes, providing a seamless and adaptive 3D experience regardless of user movement. Additionally, according to embodiments, an optical member, such as, for example, lenticular lenses or liquid-crystal lenses, may refract the display light to generate stereoscopic image light, further improving the 3D effect.

Embodiments of the present disclosure may be applied to various devices, including, for example, TVs, smartphones, tablets, laptops, wearable devices, and automotive displays. By integrating imaging elements into the display area and improving structural design, embodiments address the challenges of bezel reduction, image quality preservation, and dynamic adaptability, delivering a user-friendly and immersive stereoscopic viewing experience.

Figure 2:
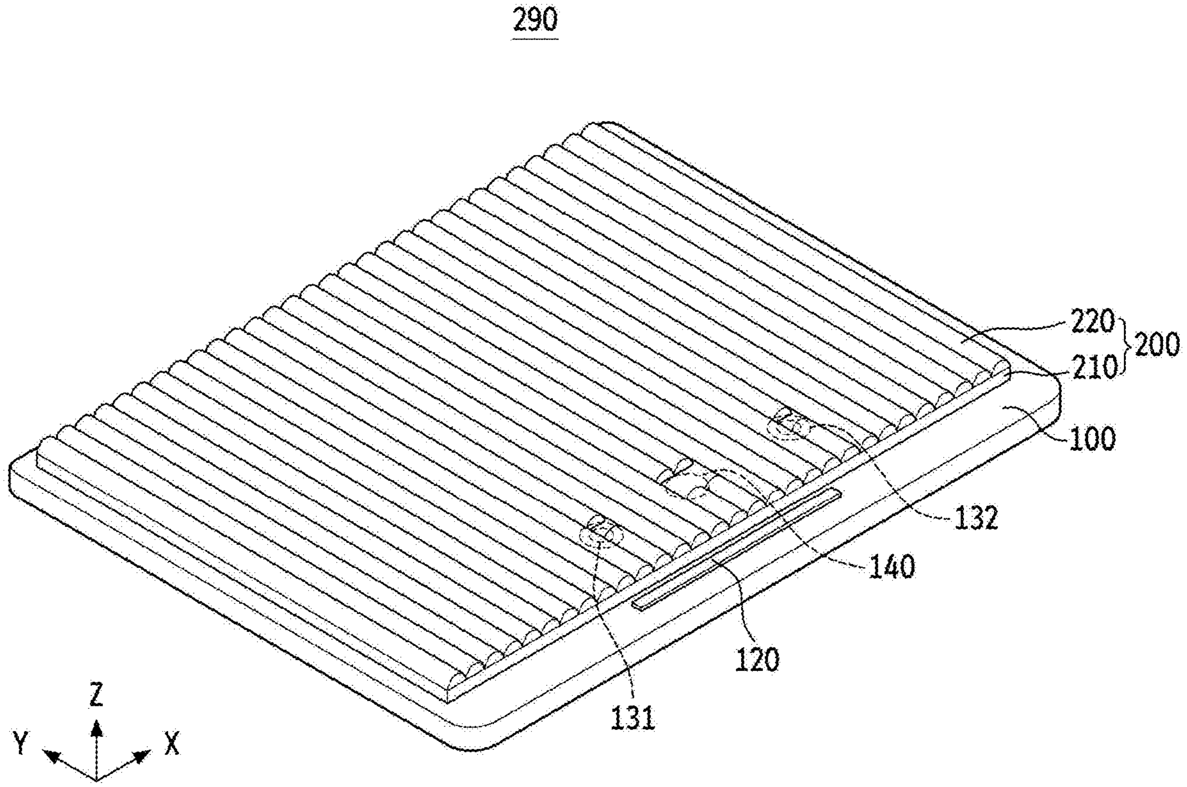
FIG. 2 is a view showing a display panel and an optical member shown in FIG. 1 when attached together.

FIG. 1 is an exploded, perspective view showing a stereoscopic image display device according to an embodiment of the present disclosure. FIG. 2 is a view showing a display panel and an optical member shown in FIG. 1 when coupled together.

Referring to FIGS. 1 and 2, a stereoscopic image display device 290 may be implemented as a flat panel display device such as, for example, a liquid-crystal display (LCD) device, a field emission display (FED) device, a plasma display panel (PDP) device, and an organic light-emitting display (OLED) device.

The display device 290 separately displays a left-eye image and a right-eye image on the front side to give a viewer 3D experiences utilizing binocular parallax. Furthermore, the display device 290 may separately provide images at different viewing angles on the front side of the display device 290 so that different images are displayed at the different viewing angles.

The display device 290 may be a light-field display device that allows different image information to be seen by a viewers' eyes, respectively, by disposing the optical member 200 on the front side of a display module 100. The light-field display device may generate a stereoscopic image by generating a light field with the display module 100 and a 3D optical member 200. As will be described in further detail below, light rays generated in each of the pixels of the display module 100 of the light-field display device form a light field directed to a particular direction (a particular viewing angle and/or a particular viewpoint) by stereoscopic lenses, pinholes or barriers. In this manner, stereoscopic image information associated with the particular direction can be provided to the viewer.

According to embodiments of the present disclosure, the display device 290 may be designed to provide a 3D viewing experience by separately displaying a left-eye image and a right-eye image on its front side, thereby utilizing binocular parallax to create the perception of depth. Additionally, the display device 290 may present distinct images at various viewing angles on its front side, enabling multiple images to be displayed simultaneously for different viewing perspectives.

Functioning as a light-field display device, the display device 290 may achieve this capability by positioning the optical member 200 on the front side of the display module 100. The combination of the display module 100 and the optical member 200 may generate a light field, which may form the foundation for creating stereoscopic images. For example, light rays emitted by individual pixels in the display module 100 may be manipulated to produce a light field directed toward specific directions, such as particular viewing angles or viewpoints. By employing stereoscopic lenses, pinholes, or barriers, the light-field display allows stereoscopic image information corresponding to these directions to be accurately delivered to the viewer, as will be described in further detail below.

The display module 100 may include a display panel 110, a main driver circuit 120, and a circuit board.

The display panel 110 may include a display area DA and a non-display area NDA. The display area DA may include data lines, scan lines, supply voltage lines, and a plurality of pixels connected to the data lines and scan lines. For example, the scan lines may be extended in the first direction (x-axis direction) and be spaced apart from one another in the second direction (y-axis direction). The data lines and the supply voltage lines may be extended in the second direction (y-axis direction) and be spaced from one another in the first direction (x-axis direction).

Each of the pixels may be connected to at least one scan line, data line, and supply voltage line. Each of the pixels may include thin-film transistors including a driving transistor and at least one switching transistor, a light-emitting element, and a capacitor. When a scan signal is applied from a scan line, each of the pixels receives a data voltage from a data line and supplies a driving current to the light-emitting element according to the data voltage applied to the gate electrode, so that light can be emitted.

Herein, the pixels of the display panel 110 display two-dimensional (2D) multi-view images according to the order in which the main driver circuit 120 provides data voltage. The multi-view images include n view images, where n is a positive integer equal to or greater than two. Such n view images are generated by capturing images of an object with n cameras spaced apart from one another by the distance between a person's eyes.

The display panel 110 displays multi-view images in units of n pixels during an image display period. For example, the display panel 110 may display multi-view images in units of two pixels. In other words, two pixels of the display panel 110 may display a multi-view image including two view images. For example, the display panel 110 may display a multi-view image in units of time-division frames (or sub-frames) according to the time-division driving of the main driver circuit 120. Multi-view images may be displayed in units of two pixels for each time-division frame. A time-division frame is a period that divides one frame into ½ or ⅓ sub-frames.

For example, according to embodiments, the pixels of the display panel 110 are configured to display 2D multi-view images in a sequential manner, as determined by the data voltage provided by the main driver circuit 120. These multi-view images include n distinct views, where n is a positive integer equal to or greater than two. Such n view images are created by capturing an object from multiple angles using n cameras, with the cameras positioned at intervals corresponding to the distance between a person's eyes.

During an image display period, the display panel 110 may present multi-view images in units of n pixels. For example, the display panel 110 may display multi-view images using two pixels per image, where each pixel represents one view in the multi-view image. Additionally, the display panel 110 may present multi-view images through time-division driving, controlled by the main driver circuit 120. In this approach, the panel may display multi-view images in units of time-division frames (or sub-frames), with two pixels representing two views in each time-division frame. A time-division frame refers to a period in which one frame is divided into smaller intervals, such as halves (½) or thirds (⅓), enabling the display of multi-view images with precise synchronization.

The non-display area NDA may be disposed at the edge of the display panel 110 to surround the display area DA. The non-display area NDA may include a scan driver that applies scan signals to scan lines, and pads connected to the main driver circuit 120. For example, the main driver circuit 120 may be disposed on one side of the non-display area NDA, and the pads may be disposed on one edge of the non-display area NDA where the main driver circuit 120 is disposed.

The main driver circuit 120 may output control signals and data voltages that drive the display panel 110. For example, the main driver circuit 120 may apply data voltages to the data lines. The main driver circuit 120 provides supply voltage to the supply voltage line, and may supply scan control signals to the scan driver. In an embodiment, the main driver circuit 120 may be implemented as an integrated circuit (IC) and may be disposed in the non-display area NDA of the display panel 110 by a chip-on-glass (COG) technique, a chip-on-plastic (COP) technique, or an ultrasonic bonding. In an embodiment, the main driver circuit 120 may be mounted on a circuit board and connected to the pads of the display panel 110.

At least one built-in camera 140 and built-in imaging elements 131 and 132 such as image sensors are disposed in the display area DA of the display panel 110. The image sensors forming the imaging elements 131 and 132 may be, for example, complementary metal-oxide-semiconductor (CMOS) or charge-coupled device (CCD) sensors, but are not limited thereto. At least one built-in camera 140 may be disposed in an area or space between the pixels arranged in the display area DA. Therefore, no image is displayed in the position and area where the built-in camera 140 is disposed. The built-in camera 140 is used by a user to capture images on the front side of the display panel 110 through an application program, etc.

The built-in imaging elements 131 and 132 such as image sensors overlap some of the pixels arranged in the display area DA and are disposed on the rear side of the some of the pixels. The imaging elements 131 and 132 may be built into the substrate of the display panel 110 or may be inserted and disposed in a groove formed in the substrate. An insulating layer, a protective layer, and pixels are formed on the front surface of the substrate where the imaging elements 131 and 132 are built. In addition, the optical member 200 is disposed on the front side of the substrate where the pixels are formed. In addition, the imaging elements 131 and 132 may be disposed on the substrate of the display panel 110 or on the rear surface of the substrate. Accordingly, an insulating layer, a protective layer, and pixels forming a planarization layer may be formed on the front surface of the substrate where the imaging elements 131 and 132 are disposed. An insulating layer, a protective layer, and pixels may be formed on the front surface of the substrate while the imaging elements 131 and 132 are disposed on the rear surface of the substrate. To this end, the substrate of the display panel 110 may be formed of, for example, a transparent glass substrate or silicon material, etc.

The imaging elements 131 and 132 capture front-side image data. The front-side image data may include both images of objects in front of the display panel 110, such as, for example, the user's eyes and face, and visual data related to the displayed content in the overlapping region of the display panel 110, e.g., images displayed on some pixels arranged on the front side of the imaging elements 131 and 132 and overlapping the imaging elements 131 and 132, under the control of the main driver circuit 120. This dual functionality according to embodiments of the present disclosure allows the imaging elements 131 and 132 to detect the user's location and/or eye positions relative to the display panel 110. Once captured, the captured front-side image data is transmitted to and analyzed by the main driver circuit 120. For example, the main driver circuit 120 may extract grayscale and luminance values for each pixel and apply image processing techniques, such as, for example, outline detection and edge analysis, to determine the coordinates of the user's left and right eye positions. This information may be used to dynamically adjust the viewing points of stereoscopic image data, allowing the system to align the displayed stereoscopic images with the user's eyes in real-time by controlling the sub-pixels in the display area DA. Thus, according to embodiments, even if the image quality of the front-side image data is degraded compared to that of a standalone camera, the system can accurately track the user's eye positions by focusing on high-contrast features such as, e.g., outlines and edges. As a result, embodiments of the present disclosure provide effective alignment of stereoscopic images, resulting in an optimal viewing experience.

The main driver circuit 120 analyzes the front-side image data captured by the imaging elements 131 and 132 of the display panel 110 or analyzes a sensing signal detected through a separate human body detection sensor to track the user's location or location coordinates. At this time, the main driver circuit 120 may analyze the front-side image data captured through the imaging elements 131 and 132 to track the coordinates of the left and right eye positions of the user. For example, the main driver circuit 120 extracts the grayscale and luminance values of the front-side image data for each pixel at least every frame. Then, image analysis processing is carried out, such as detecting the outline of the front side image and dividing the edge areas based on comparative analysis of the grayscale and luminance values. The main driver circuit 120 detects the user's location and the right and left eyes by detecting the outline and edges, and sets and tracks the coordinates of the right and left eye positions within a frame range. Then, the main driver circuit 120 changes the viewing points of the left and right eye image data based on the results of tracking the coordinates of the right eye and the left eye positions, and controls the sub-pixels for the changed viewing points so that a stereoscopic image is displayed. The coordinates of the right and left eye positions are extracted by detecting the user's location and the outline and edges of the right and left eyes from the front-side image data. Accordingly, even if the image quality of the front-side image data generated through the imaging elements 131 and 132 is degraded to, for example, about 20% to about 40% compared to the image quality of the built-in camera 140, it is possible to extract the coordinates of the right eye and left eye positions.

Then, the main driver circuit 120 changes the viewing points of the left and right eye image data based on the results of extracting the coordinates of the right eye and the left eye positions, and controls the sub-pixels for the changed viewing points so that stereoscopic images are displayed. For example, the main driver circuit 120 sets viewing points according to the left and right eye positions for each sub-pixel and viewing point numbers according to the viewing points based on the relative positions of the sub-pixels for each of 3D lenses 220 (also referred to as stereoscopic lenses) of the optical member 200. Then, the main driver circuit 120 aligns positions of image data input from an external source for each horizontal line based on the viewing points and the viewing point numbers of the sub-pixels according to the left and right eye positions. Subsequently, the main driver circuit 120 corrects the arrangement position of image data for each viewing point based on the user's location (or left and right eye positions) tracked and detected in real-time, and generates corrected image data. Subsequently, the main driver circuit 120 may generate data voltages corresponding to the corrected image data and provide the generated data voltages to the data lines, so that stereoscopic images can be displayed based on the relative positions of the sub-pixels with respect to the 3D lenses 220 and the location change of the user.

The optical member 200 may be disposed on the front side of the display module 100. The optical member 200 may be attached to one surface of the display module 100 through an adhesive member such as a resin. The optical member 200 may be attached to the front surface of the display module 100 by a panel bonding apparatus. For example, the optical member 200 may be implemented as a lenticular lens sheet including the stereoscopic lenses 220. For example, the stereoscopic lenses 220 may be implemented as liquid-crystal lenses that work as lenses by controlling liquid crystals in liquid-crystal layers. When the stereoscopic lenses 220 are implemented as the lenticular lens sheet, the stereoscopic lenses 220 may be disposed on the flat portion 210. The optical member 200 may include the stereoscopic lenses 220 and the flat portion 210.

The flat portion 210 may be disposed directly on the front side of the display module 100. For example, one surface of the flat portion 210 facing the display module 100 and the opposite surface of the flat portion 210 opposed to the one surface of the flat portion 210 may be parallel to each other. The flat portion 210 may output the light incident from the display module 100 as it is. That is, the flat portion 210 may output the light incident from the display module 100 without change. The direction of light passing through the surface of the flat portion 210 may be coincident with the direction of light passing through the opposite surface of the flat portion 210. The flat portion 210 may be formed integrally with the stereoscopic lenses 220, but the present disclosure is not limited thereto.

The stereoscopic lenses 220 may be disposed on the flat portion 210 to change the directions in which light incident from the display module 100 on the rear side exit or travel toward the front side. For example, image display light incident from the rear side of the display module 100 may pass through the flat portion 210 to reach the rear side of the stereoscopic lenses 220. For example, the optical member 200, which includes the flat portion 210 and the stereoscopic lenses 220, may refract image display light displayed in the display area DA of the display panel 110 and output the image display light as stereoscopic image display light.

The stereoscopic lenses 220 may be inclined at a predetermined angle from one side of the display module 100. For example, the stereoscopic lenses 220 may be slanted lenses inclined by a predetermined angle from the side of each of the plurality of pixels of the display panel 110 or half-cylindrical lenses. The predetermined angle may be designed to prevent the color lines of the display device from being perceived by a viewer. For example, the stereoscopic lenses 220 may be implemented as Fresnel lenses. The shape or type of the stereoscopic lenses 220 is not necessarily limited thereto.

The stereoscopic lenses 220 may be fabricated separately from the flat portion 210 and then may be attached to the flat portion 210. Alternatively, the stereoscopic lenses 220 may be formed integrally with the flat portion 210. In other words, the stereoscopic lenses 220 may be embossed into the upper surface of the flat portion 210.

In the stereoscopic lenses 220, openings MH and THn may be formed at positions and areas in front of at least one built-in camera 140 and the imaging elements 131 and 132, respectively. For example, a main hole MH for the built-in camera may be formed in front of the built-in camera 140, and a plurality of subsidiary holes THn may be further formed in front of the imaging elements 131 and 132.

According to an embodiment of the present disclosure, the stereoscopic image display device 290 includes the display panel 110, which is configured to display an image, the optical member 200, which is configured to refract image display light emitted in the display area DA of the display panel 110 and to output the refracted image display light as stereoscopic image display light, a plurality of image sensors (e.g., imaging elements 131 and 132) arranged in the display area DA and configured to capture the front-side image data, and the main driver circuit 120. The main driver circuit is configured to track a user's location and/or the user's right eye position and left eye position by analyzing the front-side image data and to control pixels in the display area DA to display right-eye image data and left-eye image data. Further, the main driver circuit 120 is configured to adjust viewing points of the right-eye image data and left-eye image data based on the result of tracking the user's location and/or the user's right eye position and left eye position, and to drive the pixels to display a stereoscopic image corresponding to the adjusted viewing points.

Figure 3:
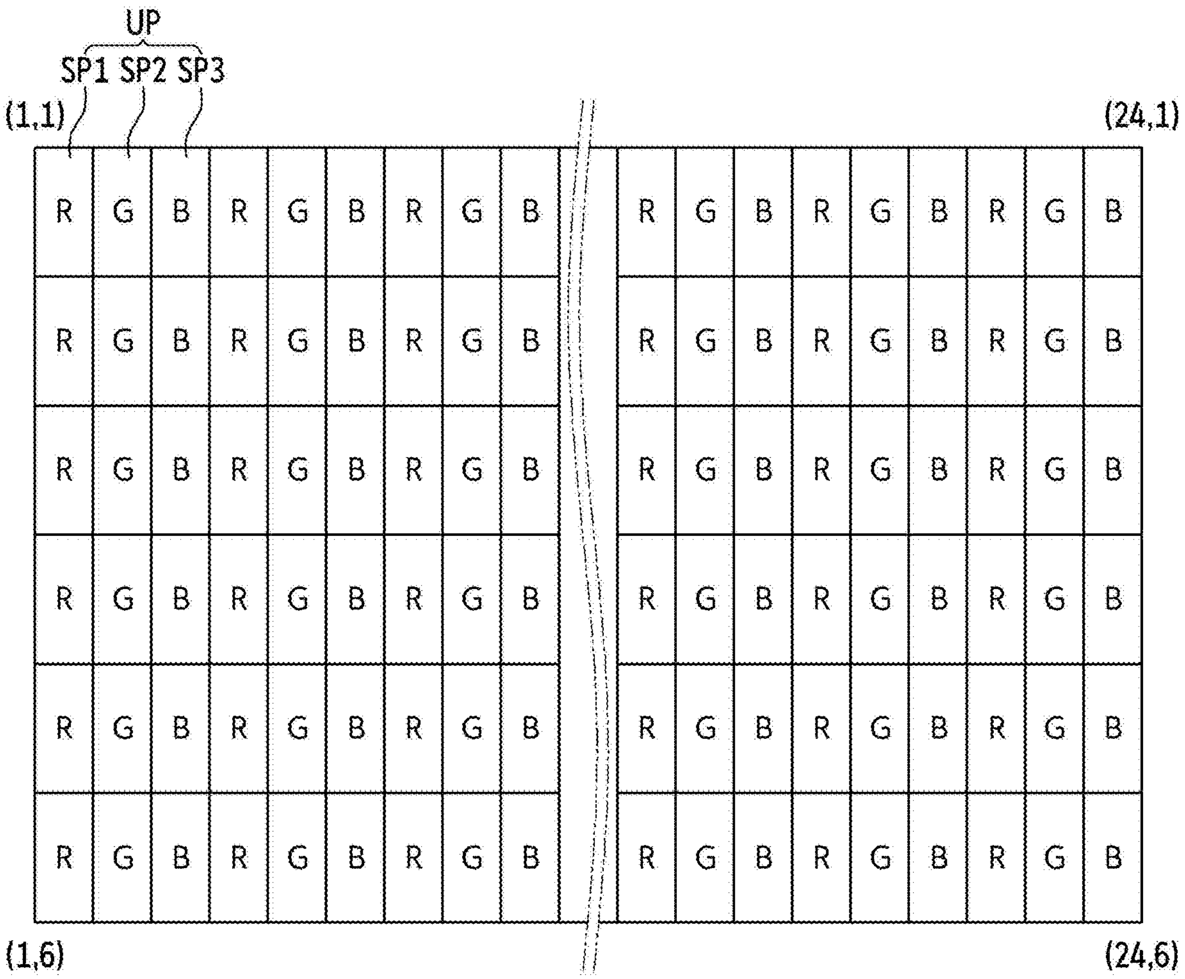
FIG. 3 is a plan view showing a part of the arrangement structure of sub-pixels in a display area of the display panel.

FIG. 3 is a plan view showing a part of the arrangement structure of the sub-pixels in the display area DA.

FIG. 3 shows the arrangement structure of sub-pixels arranged in six rows and twenty-four columns. In this arrangement, the sub-pixels are positioned sequentially, starting from the one located at the intersection of the first row and the first column and extending to the one positioned at the intersection of the sixth row and the twenty-fourth column.

Referring to FIG. 3, a plurality of unit pixels UP is disposed and formed in the display area DA of the display panel 110, and each of the unit pixels UP includes a plurality of sub-pixels SP1, SP2 and SP3. The sub-pixels SP1, SP2 and SP3 may be arranged along a plurality of rows and a plurality of columns. For example, the sub-pixels SP1, SP2 and SP3 may be arranged and formed in a vertical or horizontal stripe structure. The display area DA of the display panel 110 may include more unit pixels UP as the resolution of the display device increases.

For example, each of the unit pixels UP may include first to third sub-pixels SP1 SP2 and SP3 that display different colors. The first to third sub-pixels SP1, SP2 and SP3 may be formed and disposed at the intersections of the data lines and the scan lines. Each of the plurality of sub-pixels SP1 SP2 and SP3 may include a light-emitting element and a pixel circuit. The pixel circuit may include a driving transistor, at least one switching transistor, and at least one capacitor to drive the light-emitting element of each of the plurality of sub-pixels.

As described above, in an embodiment, each of the plurality of unit pixels UP may include one first sub-pixel SP1, one second sub-pixel SP2, and one third sub-pixel SP3. In an embodiment, each of the plurality of unit pixels UP may include four sub-pixels, e.g., one first sub-pixel SP1, two second sub-pixels SP2, and one third sub-pixel SP3. However, the number of sub-pixels included in each unit pixel UP is not necessarily limited thereto. The first sub-pixel SP1 may be a red sub-pixel, the second sub-pixel SP2 may be a green sub-pixel, and the third sub-pixel SP3 may be a blue sub-pixel. Each of the first to third sub-pixels SP1 SP2 and SP3 may receive a data signal including luminance information of red, green or blue light from the main driver circuit 120 and may output light of the respective color.

Figure 4:
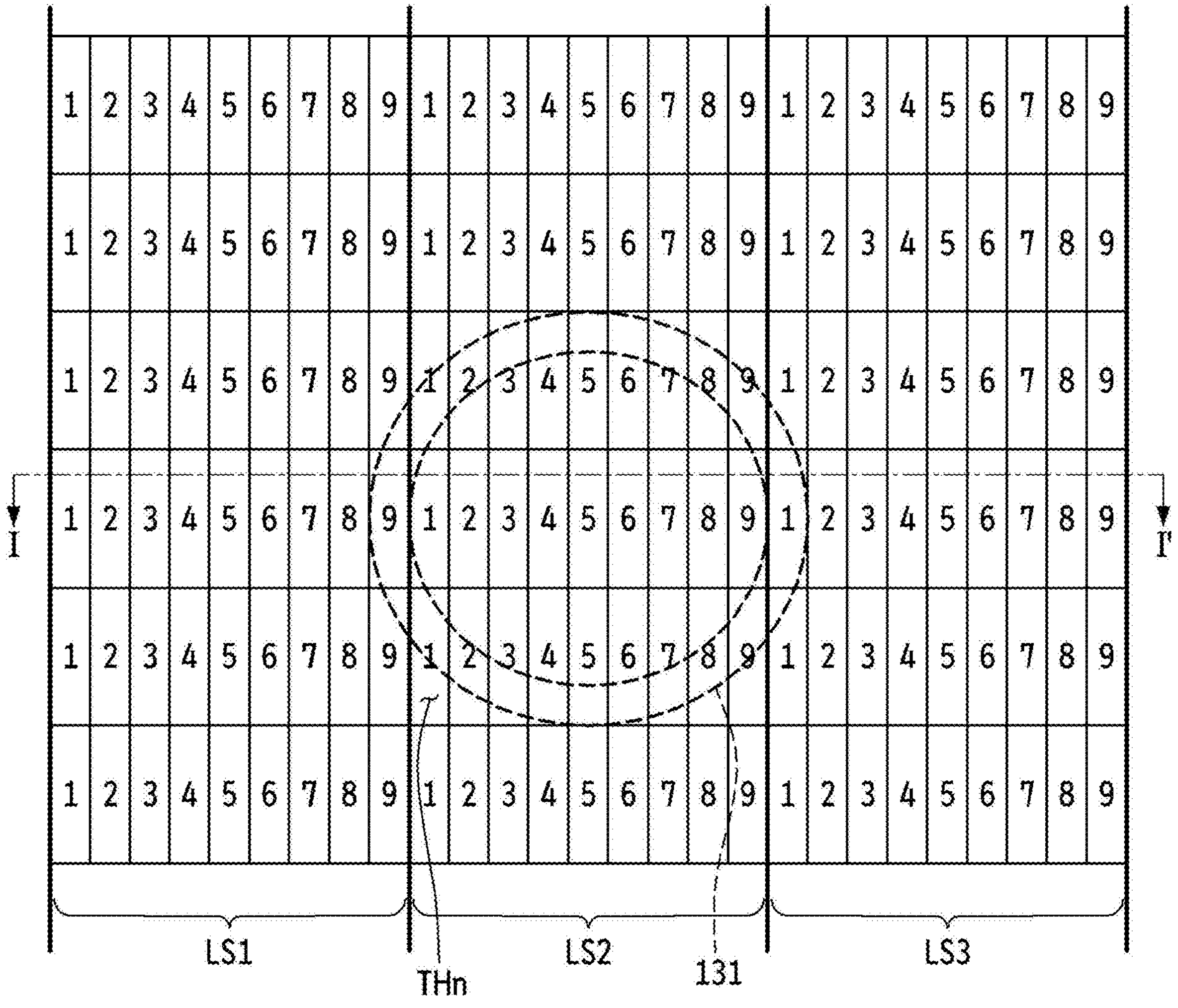
FIG. 4 is a view showing a sub-pixel arrangement structure in an image display area in which an imaging element is disposed, and a method of setting viewing point information for each sub-pixel according to the lens width of an optical member.

FIG. 4 is a view showing a sub-pixel arrangement structure in an image display area in which an imaging element is disposed, and a method of setting viewing point information for each sub-pixel according to the lens width of an optical member.

Referring to FIG. 4, the imaging elements 131 and 132 may be built into the substrate of the display panel 110 or may be inserted and disposed in grooves formed in the substrate. An insulating layer, a protective layer, and sub-pixels SP1, SP2 and SP3 are formed on the front surface of the substrate where the imaging elements 131 and 132 are built. In addition, the optical member 200 is disposed on the front surface of the substrate where the sub-pixels SP1, SP2 and SP3 are formed. A plurality of subsidiary holes THn may be formed at areas of the stereoscopic lenses 220 in front of the imaging elements 131 and 132.

The imaging elements 131 and 132 capture images of the front side of the display panel 110 together with images displayed on some of the sub-pixels SP1, SP2 and SP3 disposed in front of the imaging elements 131 and 132 to generate front-side image data.

The viewing point information and viewing point number for each sub-pixel are set by the width and inclination angle of each of the stereoscopic lenses 220 of the optical member 200, e.g., the individual anisotropic lenses LS1, LS2 and LS3. For example, the relative positions of the sub-pixels SP1, SP2 and SP3 overlapping the anisotropic lenses LS1, LS2 and LS3 may be set in order depending on the width and slanted angle of each of the anisotropic lenses LS1, LS2 and LS3.

For example, the view point information and view point number according to the relative positions of the sub-pixels SP1, SP2 and SP3 overlapping the anisotropic lenses LS1, LS2 and LS3, respectively, may be designated repeatedly in the width direction of the anisotropic lenses LS1, LS2 and LS3 or in the x-axis direction.

The view point information (or view point numbers) of the sub-pixels arranged in the first horizontal line and the view point information from the second horizontal line to the last horizontal line are the same in the y-axis direction (or vertical direction).

For example, the viewing point information for each of the sub-pixels SP1, SP2 and SP3 is designated based on the relative positions of the sub-pixels SP1, SP2 and SP3 of each of the anisotropic lenses LS1, LS2 and LS3, and image display points or viewing points of the display device 290 are designated based on the viewing point information and number of each of the sub-pixels SP1, SP2 and SP3.

As shown in FIG. 4, the image display points or viewing points of the display device 290 may be in line with or lie within the width of each of the anisotropic lenses LS1, LS2 and LS3, and may be set in the same manner as the number and the viewing point numbers of the sub-pixels disposed on the rear surface of each of the anisotropic lenses LS1, LS2 and LS3. For example, the viewing points may be in line with or lie within the width of the rear surface (or base surface or base side) of each of the anisotropic lenses LS2, LS2 and LS3. For example, if the number of the sub-pixels disposed on the rear surface of each of the anisotropic lenses LS1, LS2 and LS3 is nine, there may be nine view points for detecting optical properties of the display device 290.

For example, when the number of sub-pixels arranged on the rear surface of each of the anisotropic lenses LS1, LS2, and LS3 is nine, the first to fourth viewing points may be set to display left-eye images, and the sixth to ninth viewing points may be set to display right-eye images. The fifth viewing point may be separately configured to selectively display either left-eye or right-eye images depending on the user's location. The number of separated viewing points for displaying left-eye or right-eye images may vary dynamically, changing at least every frame. This configuration is not limited to 4, 8, 12 points, etc., and can be adjusted in various ways according to embodiments.

Figure 5:
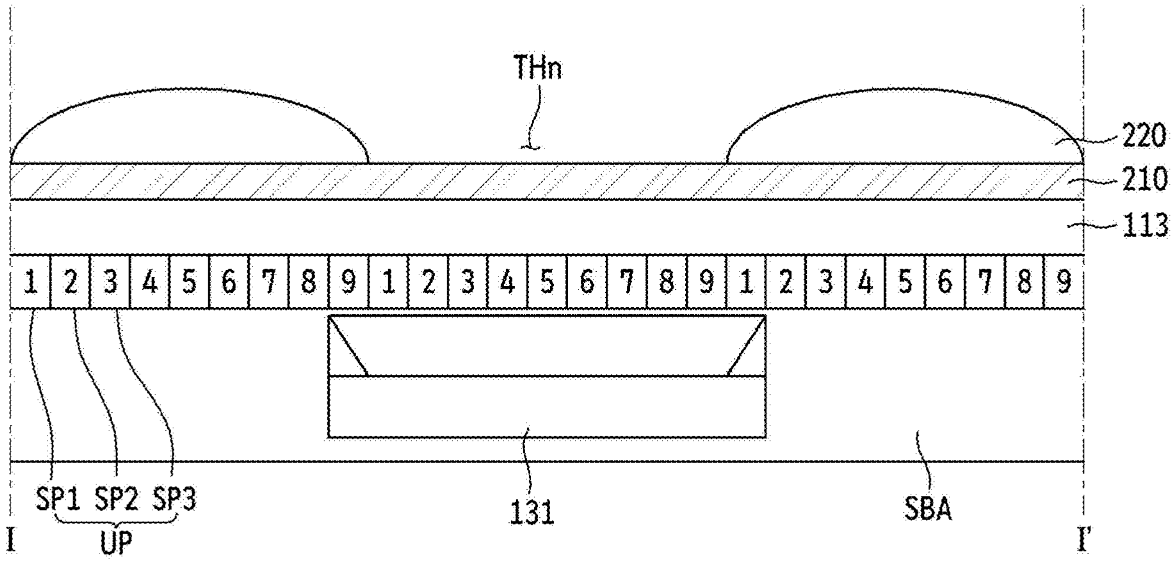
FIG. 5 is a cross-sectional view showing the sub-pixels and the optical member according to an embodiment, taken along line I-I' shown in FIG. 4.

FIG. 5 is a cross-sectional view showing the sub-pixels SP1, SP2, and SP3 and the optical member 200 according to an embodiment, taken along line I-I' shown in FIG. 4.

Referring to FIG. 5, the imaging elements 131 and 132 may be built into a substrate SBA of the display panel 110, or the imaging elements 131 and 132 may be inserted and disposed in grooves formed in the substrate SBA.

An insulating layer is formed on the front surface of the substrate SBA where the imaging elements 131 and 132 are built, and sub-pixels SP1, SP2 and SP3 are formed and disposed on the front side of the insulating layer.

On the front surface of the display panel 110 where the sub-pixels SP1, SP2 and SP3 are formed, a protective layer 113 may be further formed to protect and flatten the front surface of the display panel 110. The protective layer 113 may be formed as an inorganic insulating layer including an inorganic material.

On the front surface of the display panel 110 where the protective layer 113 is formed, the optical member 200 (e.g., the flat portion 210 and the stereoscopic lenses 220) is disposed to refract the display light of the stereoscopic image displayed in the display area DA in a first refraction direction or a second refraction direction to output the light.

The optical member 200 is disposed and attached to the front surface of the display panel 110 with the stereoscopic lenses 220 arranged on the flat portion 210. The flat portion 210 may be formed integrally with the stereoscopic lenses 220. The subsidiary holes THn may be formed at the positions of the stereoscopic lenses 220 in line with the positions of the imaging elements 131 and 132.

The first to third sub-pixels SP1, SP2 and SP3 sequentially arranged in the display area DA of the display panel 110 display multi-view images according to the viewing point numbers (e.g., the first to ninth viewing point numbers) set at least every frame. The first to third sub-pixels SP1, SP2 and SP3 may display 2D multi-view images in units of at least two adjacent sub-pixels. For example, at least every two adjacent sub-pixels may display multi-view images including two view images.

The imaging elements 131 and 132 capture images of the front side of the display panel 110 together with the colors of the display light and images displayed on the sub-pixels SP1, SP2 and SP3 disposed in front of the imaging elements 131 and 132 to generate front-side image data.

The main driver circuit 120 analyzes front-side image data captured by the imaging elements 131 and 132 of the display device 290 to track the coordinates of the left and right eye positions of the user. Then, the main driver circuit 120 changes the viewing points of the left and right eye image data based on the results of tracking the coordinates of the user's location or the right eye and the left eye positions, and controls the sub-pixels SP1, SP2 and SP3 for the changed viewing points so that a stereoscopic image is displayed.

The main driver circuit 120 changes and sets viewing points for image data for each sub-pixel based on the relative positions of the sub-pixels SP1, SP2 and SP3 for each of the stereoscopic lenses 220 of the optical member 200 and the results of tracking the coordinates of the right-eye and left-eye positions. Then, the main driver circuit 120 matches the viewing point numbers of each of the sub-pixels SP1, SP2 and SP3, to provide data voltage to each of the sub-pixels SP1, SP2 and SP3.

For example, in an embodiment, the main driver circuit 120 processes the front-side image data captured by the imaging elements 131 and 132 of the display device 290 to determine the coordinates of the user's left and right eye positions. Based on this tracking information, the main driver circuit 120 adjusts the viewing points of the left-eye and right-eye image data accordingly. The main driving circuit 120 then controls the sub-pixels SP1, SP2, and SP3 to correspond with the updated viewing points, and thus, the stereoscopic image may be displayed correctly.

To achieve this, the main driver circuit 120 may recalibrate and set the viewing points for the image data associated with each sub-pixel. This recalibration may be based on the relative positions of the sub-pixels SP1, SP2, and SP3 under each of the stereoscopic lenses 220 within the optical member 200, as well as the tracked coordinates of the user's left and right eye positions. Subsequently, the main driver circuit 120 may align the viewing point numbers assigned to each sub-pixel with the corresponding data voltage, and thus, the sub-pixels SP1, SP2, and SP3 may display the correct image data for the adjusted viewing points.

Figure 6:
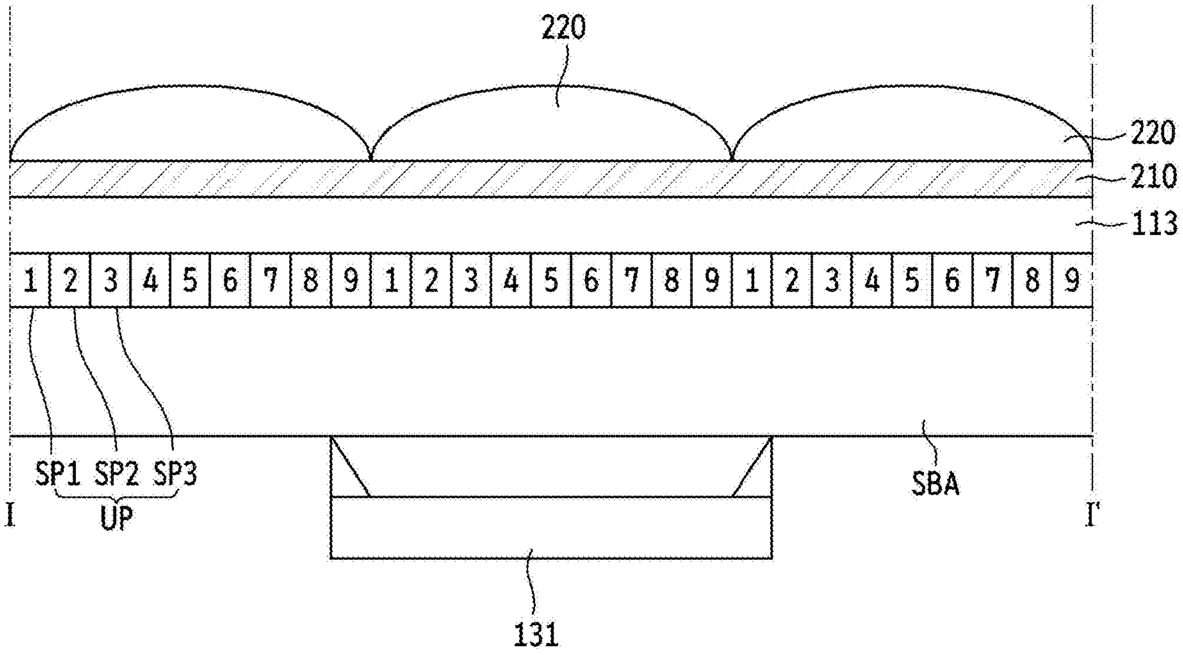
FIG. 6 is a cross-sectional view showing the sub-pixels and the optical member according to an embodiment, taken along line I-I' shown in FIG. 4.

FIG. 6 is a cross-sectional view showing the sub-pixels SP1, SP2, and SP3 and the optical member 200 according to an embodiment, taken along line I-I' shown in FIG. 4.

Referring to FIG. 6, the imaging elements 131 and 132 may be disposed on the rear surface of the substrate SBA. With the imaging elements 131 and 132 disposed on the rear surface of the substrate SBA, at least one insulating layer and sub-pixels SP1, SP2 and SP3 are formed on the front surface of the substrate SBA. To this end, the substrate SBA of the display panel 110 may be formed of, for example, a transparent glass substrate or silicon material, etc.

On the front surface of the display panel 110 where the sub-pixels SP1, SP2 and SP3 are formed, a protective layer 113 may be formed to protect and flatten the front surface of the display panel 110. On the front surface of the display panel 110 where the protective layer 113 is formed, the optical member 200 (e.g., the flat portion 210 and the stereoscopic lenses 220) is disposed to refract the display light of the stereoscopic image displayed in the display area DA in a first refraction direction or a second refraction direction to output the light. The stereoscopic lenses 220 may also be arranged in front of the imaging elements 131 and 132.

As described above, the coordinates of the right and left eye positions are extracted by detecting the user's location and the outline and edges of the right and left eyes from the front-side image data. Accordingly, even if the image quality of the front-side image data generated through the imaging elements 131 and 132 is degraded to, for example, about 20% to about 40% compared to the image quality of the built-in camera 140, it is possible to extract the coordinates of the right eye and left eye positions. Accordingly, according to experimental results, when the image quality of the front-side image data is maintained at a level between about 20% and about 40% relative to the image quality of the built-in camera 140, the stereoscopic lenses 220 may be arranged in front of the imaging elements 131 and 132.

Figure 7:
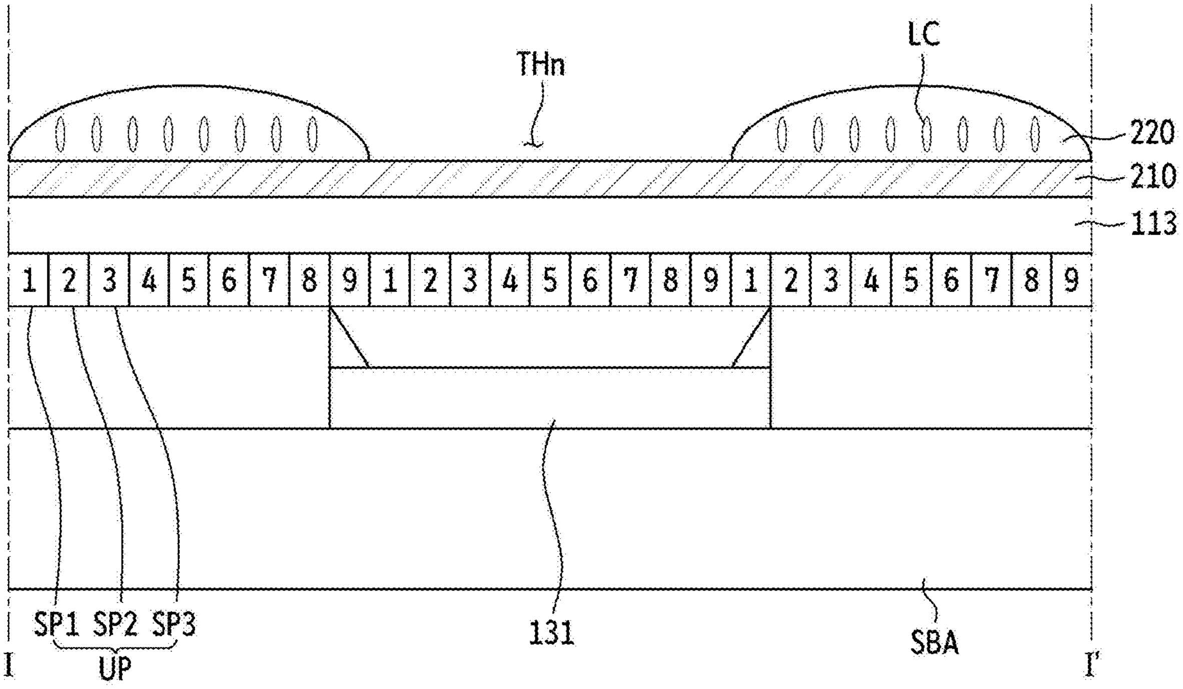
FIG. 7 is a cross-sectional view showing the sub-pixels and the optical member according to an embodiment, taken along line I-I' shown in FIG. 4.

FIG. 7 is a cross-sectional view showing the sub-pixels SP1, SP2, and SP3 and the optical member 200 according to an embodiment, taken along line I-I' shown in FIG. 4.

Referring to FIG. 7, the imaging elements 131 and 132 may be disposed on the substrate SBA of the display panel 110. An insulating film forming a planarization layer may be further formed on the front side of the substrate SBA where the imaging elements 131 and 132 are disposed. Sub-pixels SP1, SP2 and SP3 may be formed on the front surface of the planarization layer, and a protective layer 113 is formed on the front surface of the display panel 110 where the sub-pixels SP1, SP2 and SP3 are formed to protect the front surface of the display panel 110 and to provide a flat surface. On the front surface of the display panel 110 where the protective layer 113 is formed, the optical member 200 (e.g., the flat portion 210 and the stereoscopic lenses 220) is disposed to refract the display light of the stereoscopic image displayed in the display area DA in a first refraction direction or a second refraction direction to output it.

The optical member 200 is disposed and attached to the front surface of the display panel 110 with the stereoscopic lenses 220 arranged on the flat portion 210. The stereoscopic lenses 220 may include anisotropic lenses including a plurality of slits or a birefringent material such as liquid crystal LC that forms a linear polarization direction of light passing from the rear side to the front side. That is, the birefringent materials may modify (e.g., refract) a linear polarization direction of image display light passing through the stereoscopic lenses from a rear side of the stereoscopic lenses to a front side of the stereoscopic lenses.

Depending on the arrangement of birefringent materials such as liquid crystals LC included inside the stereoscopic lens 220, the stereoscopic lenses 220 may refract the display light of the stereoscopic image displayed in the display area DA in the first refraction direction and the second refraction direction to output the light.

The stereoscopic lenses 220 and the birefringent materials of the stereoscopic lenses 220 can maintain the image quality of the displayed image by maintaining light output toward the front side of the stereoscopic lenses 220 in the first refraction direction or the second refraction direction. In addition, the image quality, grayscale and brightness characteristics of the front-side image data generated through the imaging elements 131 and 132 may be maintained with minimal alteration.

Figure 8:
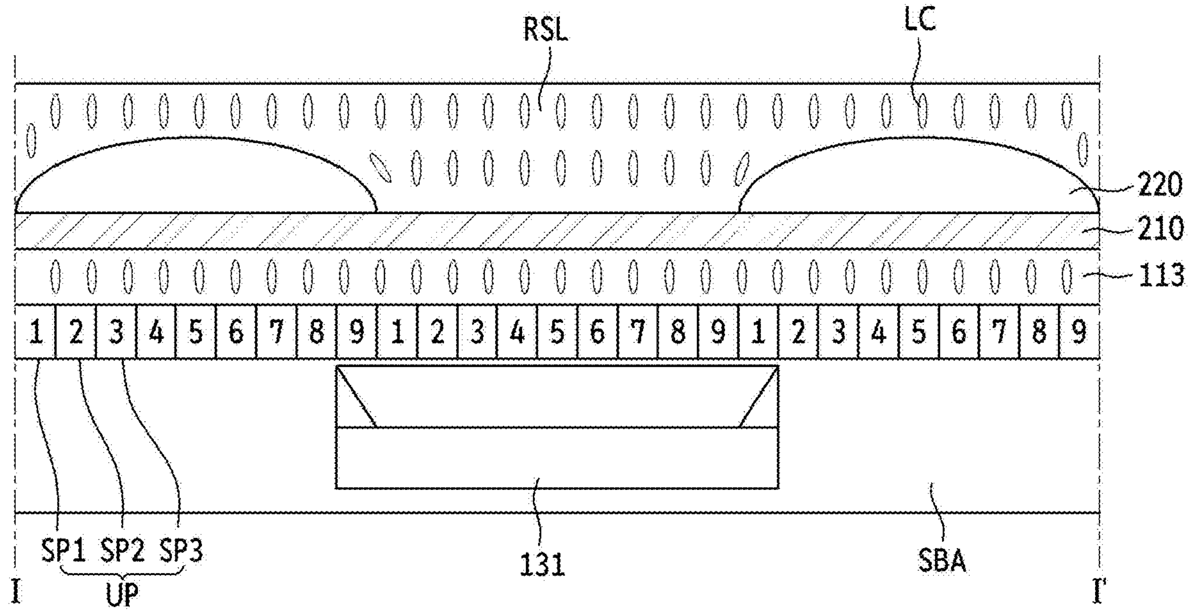
FIG. 8 is a cross-sectional view showing the sub-pixels and the optical member according to an embodiment, taken along line I-I' shown in FIG. 4.

FIG. 8 is a cross-sectional view showing the sub-pixels SP1, SP2, and SP3 and the optical member 200 according to an embodiment, taken along line I-I' shown in FIG. 4.

Referring to FIG. 8, the optical member 200 (e.g., the flat portion 210 and the stereoscopic lenses 220) is disposed on the front side of the display panel 110 where the protective layer 113 is formed as an inorganic insulating layer such as an inorganic material. In addition, a cover refractive layer RSL made of the same inorganic material as the protective layer 113 may be further formed on the front side of the optical member 200 including the subsidiary holes THn of the optical member 200. It should be noted that at least one layer of the protective layer 113 and the cover refractive layer RSL may include a plurality of slits or a birefringent material such as liquid crystals LC, which forms a linear polarization direction of light passing from the rear side to the front side.

The birefringent materials included in at least one layer of the protective layer 113 and the cover refractive layer RSL can maintain the image quality of the displayed image by maintaining light output toward the front side of the stereoscopic lenses 220 in the first refraction direction or the second refraction direction. In addition, the image quality, grayscale and brightness characteristics of the front-side image data generated through the imaging elements 131 and 132 may be maintained with minimal alteration.

Figure 9:
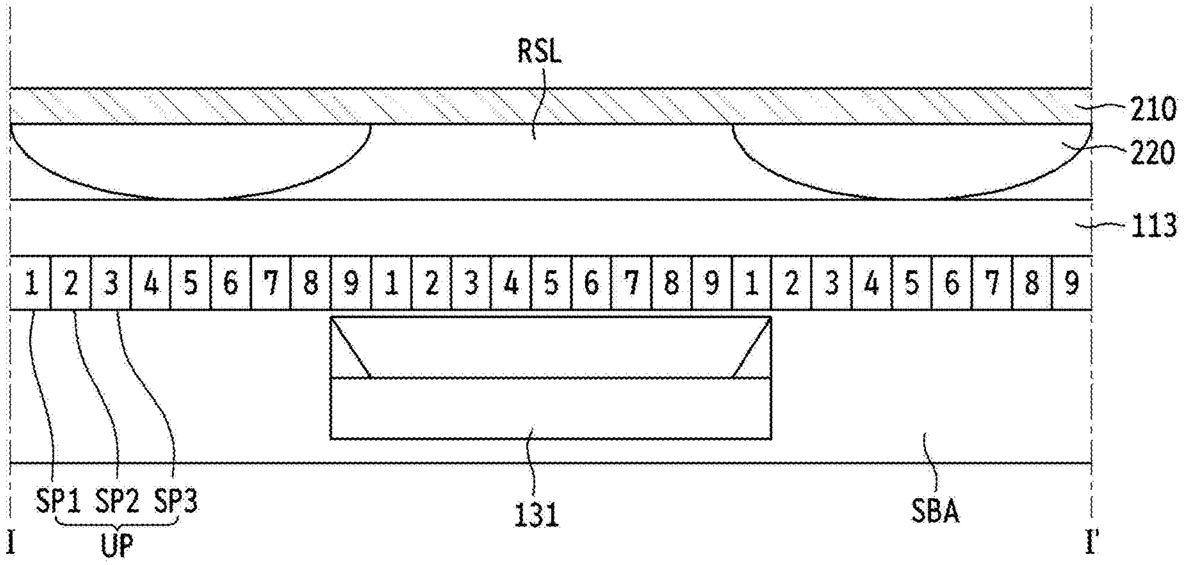
FIG. 9 is a cross-sectional view showing the sub-pixels and the optical member according to an embodiment, taken along line I-I' shown in FIG. 4.

FIG. 9 is a cross-sectional view showing the sub-pixels SP1, SP2, and SP3 and the optical member 200 according to an embodiment, taken along line I-I' shown in FIG. 4.

Referring to FIG. 9, an insulating layer is formed on the front surface of the substrate SBA where the imaging elements 131 and 132 are built, and sub-pixels SP1, SP2 and SP3 are formed and disposed on the front side of the insulating layer. On the front surface of the display panel 110 where the sub-pixels SP1, SP2 and SP3 are formed, a protective layer 113 may be formed to protect and flatten the front surface of the display panel 110.

A cover refractive layer RSL made of the same inorganic material as the protective layer 113 is additionally deposited and formed on the front side of the display panel 110 where the protective layer 113 is cured. The optical member 200 (e.g., the flat portion 210 and the stereoscopic lenses 220) is disposed on the front side of the display panel 110 where the cover refractive layer RSL is additionally formed in a direction facing the cover refractive layer RSL. For example, the optical member 200 where the stereoscopic lenses 220 are disposed on the flat portion 210 is disposed in a direction facing the cover refractive layer RSL, so that the stereoscopic lenses 220 are connected on the protective layer 113. The subsidiary holes THn may be formed at the positions of the stereoscopic lenses 220 in line with the positions of the imaging elements 131 and 132.

The optical member 200 in which the stereoscopic lenses 220 are disposed to face the display panel 100 may refract the display light of the stereoscopic image displayed in the display area DA in the first refraction direction or the second refraction direction to output the light.

The imaging elements 131 and 132 capture images of the front side of the display panel 110 together with the colors of the display light and images displayed by the sub-pixels SP1, SP2 and SP3 disposed in front of the imaging elements 131 and 132 to generate front-side image data.

The main driver circuit 120 analyzes front image data captured by the imaging elements 131 and 132 of the display device 290 to track the coordinates of the left and right eye positions of the user. Then, the main driver circuit 120 changes the viewing points of the left and right eye image data based on the results of tracking the coordinates of the user's location or the right eye and the left eye positions, and controls the sub-pixels SP1, SP2 and SP3 for the changed viewing points so that a stereoscopic image is displayed.

Figure 10:
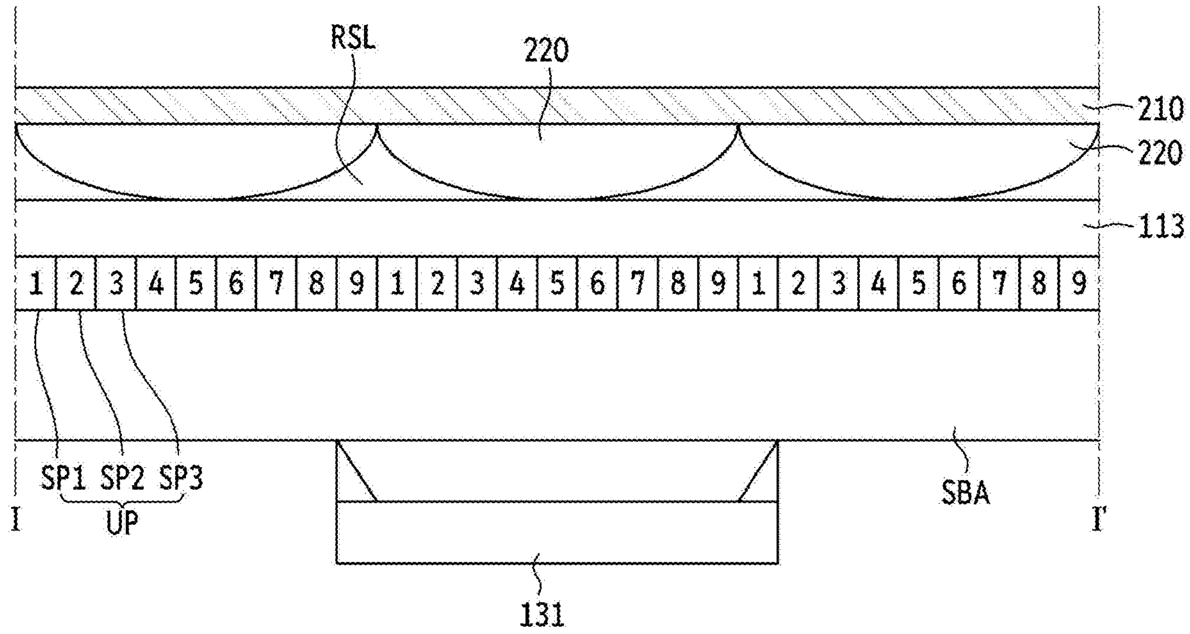
FIG. 10 is a cross-sectional view showing the sub-pixels and the optical member according to an embodiment, taken along line I-I' shown in FIG. 4.

FIG. 10 is a cross-sectional view showing the sub-pixels SP1, SP2, and SP3 and the optical member 200 according to an embodiment, taken along line I-I' shown in FIG. 4.

Referring to FIG. 10, the imaging elements 131 and 132 may be disposed on the rear surface of the substrate SBA. With the imaging elements 131 and 132 disposed on the rear surface of the substrate SBA, at least one insulating layer and sub-pixels SP1, SP2 and SP3 are formed on the front surface of the substrate SBA. To this end, the substrate SBA of the display panel 110 may be formed of, for example, a transparent glass substrate or silicon material, etc.

On the front surface of the display panel 110 where the sub-pixels SP1, SP2 and SP3 are formed, a protective layer 113 may be formed to protect and flatten the front surface of the display panel 110. On the front surface of the display panel 110 where the protective layer 113 is formed, the optical member 200 (e.g., the flat portion 210 and the stereoscopic lenses 220) is disposed to refract the display light of the stereoscopic image displayed in the display area DA in a first refraction direction or a second refraction direction to output the light. The stereoscopic lenses 220 may also be arranged in front of the imaging elements 131 and 132.

A cover refractive layer RSL made of the same inorganic material as the protective layer 113 is additionally deposited and formed on the front side of the display panel 110 where the protective layer 113 is cured. The optical member 200 is disposed on the front side of the display panel 110 where the cover refractive layer RSL is additionally formed in a direction facing the cover refractive layer RSL. For example, the optical member 200 where the stereoscopic lenses 220 are disposed on the flat portion 210 is disposed in a direction facing the cover refractive layer RSL, so that the stereoscopic lenses 220 are connected on the protective layer 113.

As described above, even if the image quality of the front side image data generated through the imaging elements 131 and 132 is degraded to about 20% to about 40% compared to the image quality of the built-in camera 140, the coordinates of the right eye and left eye positions may be extracted. Accordingly, if the image quality of the front side image data is maintained at a level between about 20% and about 40% of the image quality of the built-in camera 140 based on the experimental results, the stereoscopic lenses 220 may be arranged in front of the imaging elements 131 and 132.

Figure 11:
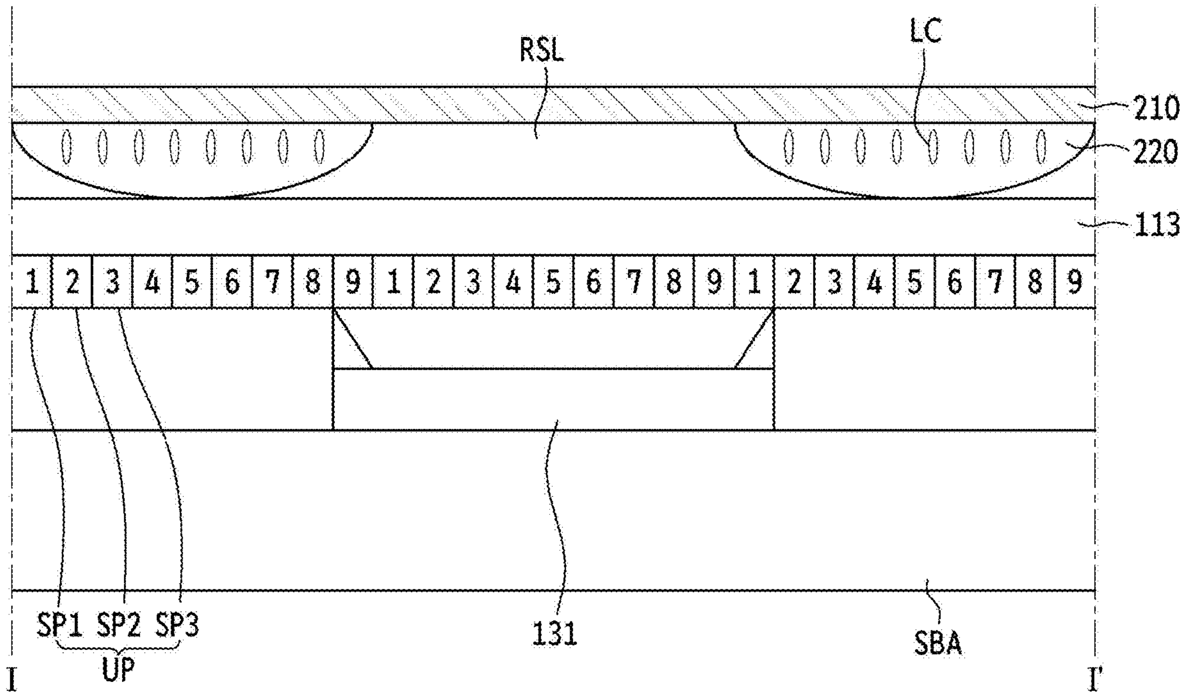
FIG. 11 is a cross-sectional view showing the sub-pixels and the optical member according to an embodiment, taken along line I-I' shown in FIG. 4.

FIG. 11 is a cross-sectional view showing the sub-pixels SP1, SP2, and SP3 and the optical member 200 according to an embodiment, taken along line I-I' shown in FIG. 4.

Referring to FIG. 11, the imaging elements 131 and 132 may be disposed on the substrate SBA of the display panel 110. An insulating layer forming a planarization layer may be further formed on the front side of the substrate SBA where the imaging elements 131 and 132 are disposed. Sub-pixels SP1, SP2 and SP3 may be formed on the front surface of the planarization layer, and a protective layer 113 is formed on the front surface of the display panel 110 where the sub-pixels SP1, SP2 and SP3 are formed to protect the front surface of the display panel 110 and to provide a flat surface.

A cover refractive layer RSL made of the same inorganic material as the protective layer 113 is additionally deposited and formed on the front side of the display panel 110 where the protective layer 113 is cured. The optical member 200 (e.g., the flat portion 210 and the stereoscopic lenses 220) is disposed on the front side of the display panel 110 where the cover refractive layer RSL is additionally formed in a direction facing the cover refractive layer RSL.

For example, the optical member 200 is disposed in a direction facing the cover refractive layer RSL on the front side of the display panel 110 where the cover refractive layer RSL is formed. The optical member 200 is disposed in a direction facing the cover refractive layer RSL, so that the stereoscopic lenses 220 are connected on the protective layer 113. The stereoscopic lenses 220 may include anisotropic lenses including a plurality of slits or a birefringent material such as liquid crystals LC that forms a linear polarization direction of light emitted and output from the display panel 110.

Depending on the arrangement of birefringent materials such as liquid crystals LC included inside the stereoscopic lens 220, the stereoscopic lenses 220 may refract the display light of the stereoscopic image displayed in the display area DA in the first refraction direction and the second refraction direction to output the light.

The stereoscopic lenses 220 and the birefringent materials of the stereoscopic lenses 220 can maintain the image quality of the displayed image by maintaining light output toward the front side of the display panel 110 in the first refraction direction or the second refraction direction. In addition, the image quality, grayscale and brightness characteristics of the front-side image data generated through the imaging elements 131 and 132 may be maintained with minimal alteration.

Figure 12:
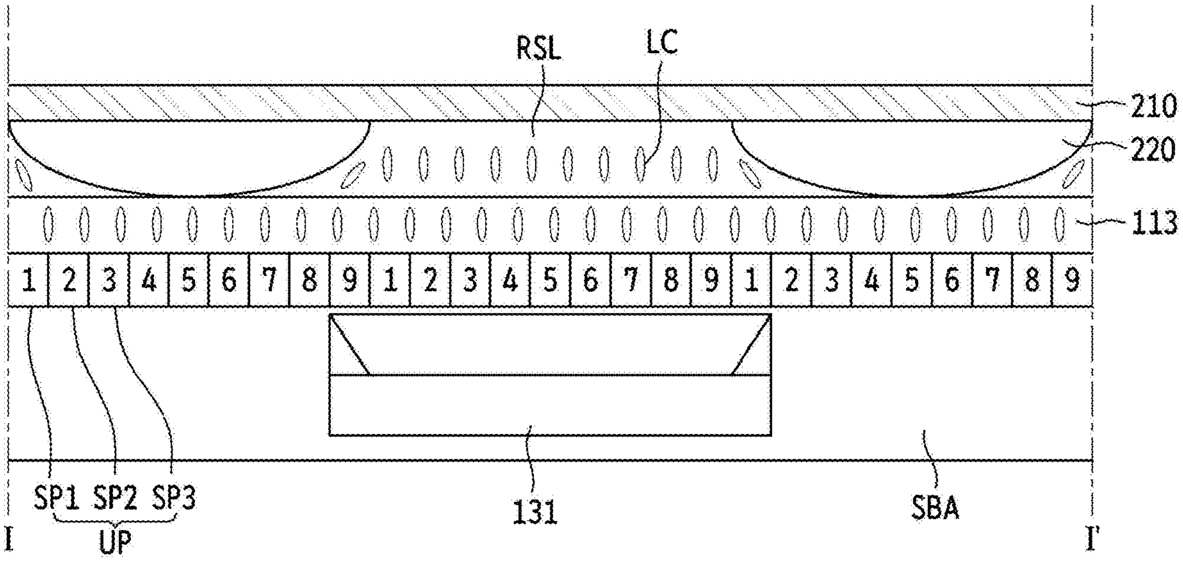
FIG. 12 is a cross-sectional view showing the sub-pixels and the optical member according to an embodiment, taken along line I-I' shown in FIG. 4.

FIG. 12 is a cross-sectional view showing the sub-pixels SP1, SP2, and SP3 and the optical member 200 according to an embodiment, taken along line I-I' shown in FIG. 4.

Referring to FIG. 12, a cover refractive layer RSL made of the same inorganic material as the protective layer 113 is formed on the front side of the display panel 110 where the protective layer 113 is formed. The optical member 200 (e.g., the flat portion 210 and the stereoscopic lenses 220) is disposed on the front side of the display panel 110 where the cover refractive layer RSL is formed in a direction facing the cover refractive layer RSL. According to embodiments, at least one layer of the protective layer 113 and the cover refractive layer RSL may include a plurality of slits or a birefringent material such as liquid crystal LC, which forms a linear polarization direction of light passing from the rear side to the front side.

The birefringent materials included in at least one layer of the protective layer 113 and the cover refractive layer RSL can maintain the image quality of the displayed image by maintaining light output toward the front side of the stereoscopic lenses 220 in the first refraction direction or the second refraction direction. In addition, the image quality, grayscale and brightness characteristics of the front-side image data generated through the imaging elements 131 and 132 may be maintained with minimal alteration.

The display device 290 according to an embodiment of the present disclosure can be applied to various electronic devices. The electronic device according to an embodiment of the present disclosure includes the display device 290 described above, and may further include modules or devices having additional functions in addition to the display device 290.

Figure 13:
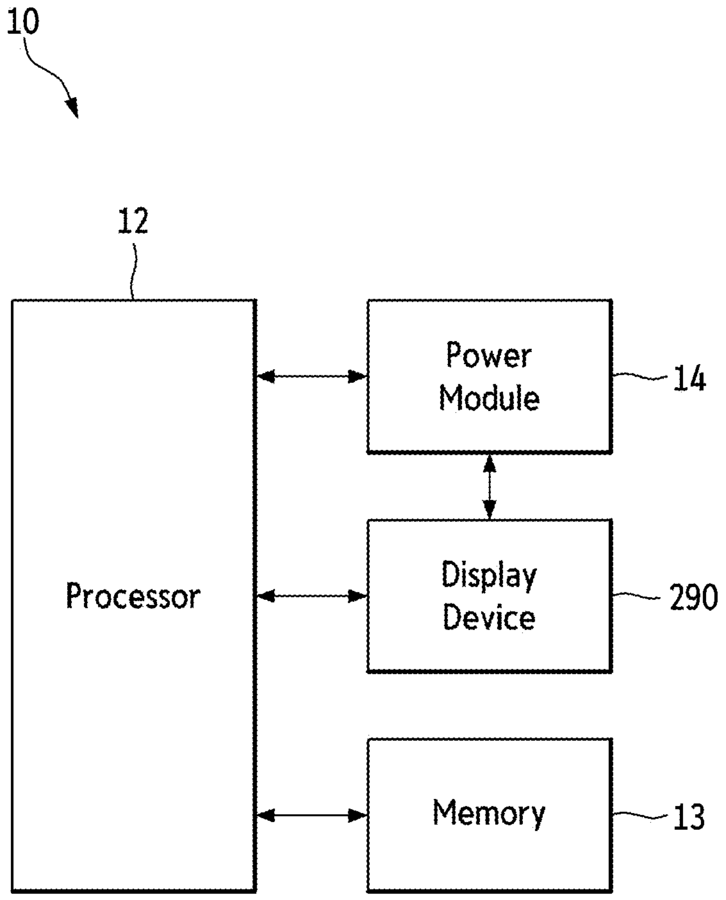
FIG. 13 is a block diagram of an electronic device according to an embodiment of the present disclosure.

FIG. 13 is a block diagram of an electronic device according to an embodiment of the present disclosure.

Referring to FIG. 13, the electronic device 10 according to an embodiment of the present disclosure may include a display device (e.g., the display device 290), a processor 12, a memory 13, and a power module 14 (also referred to as a power circuit).

The processor 12 may include at least one of, for example, a central processing unit (CPU), an application processor (AP), a graphic processing unit (GPU), a communication processor (CP), an image signal processor (ISP), and a controller.

The memory 15 may store data utilized for the operation of the processor 12 or the display device 290. When the processor 12 executes an application stored in the memory 15, an image data signal and/or an input control signal is transmitted to the display device 290, and the display device 290 can process the received signal and output image information through a display screen.

The power module 14 may include a power supply module such as, for example a power adapter or a battery, and a power conversion module that converts the power supplied by the power supply module to generate power utilized for the operation of the electronic device 10.

At least one of the components of the electronic device 10 according to an embodiment of the present disclosure may be included in the display device 10 according to embodiments of the present disclosure described above. In addition, some modules of the individual modules functionally included in one module may be included in the display device 10, and other modules may be provided separately from the display device 10. For example, the display device 10 may include the display device 290, and the processor 12, the memory 13, and the power module 14 may be provided in the form of other devices within the electronic device 10 other than the display device 10.

Figure 14:
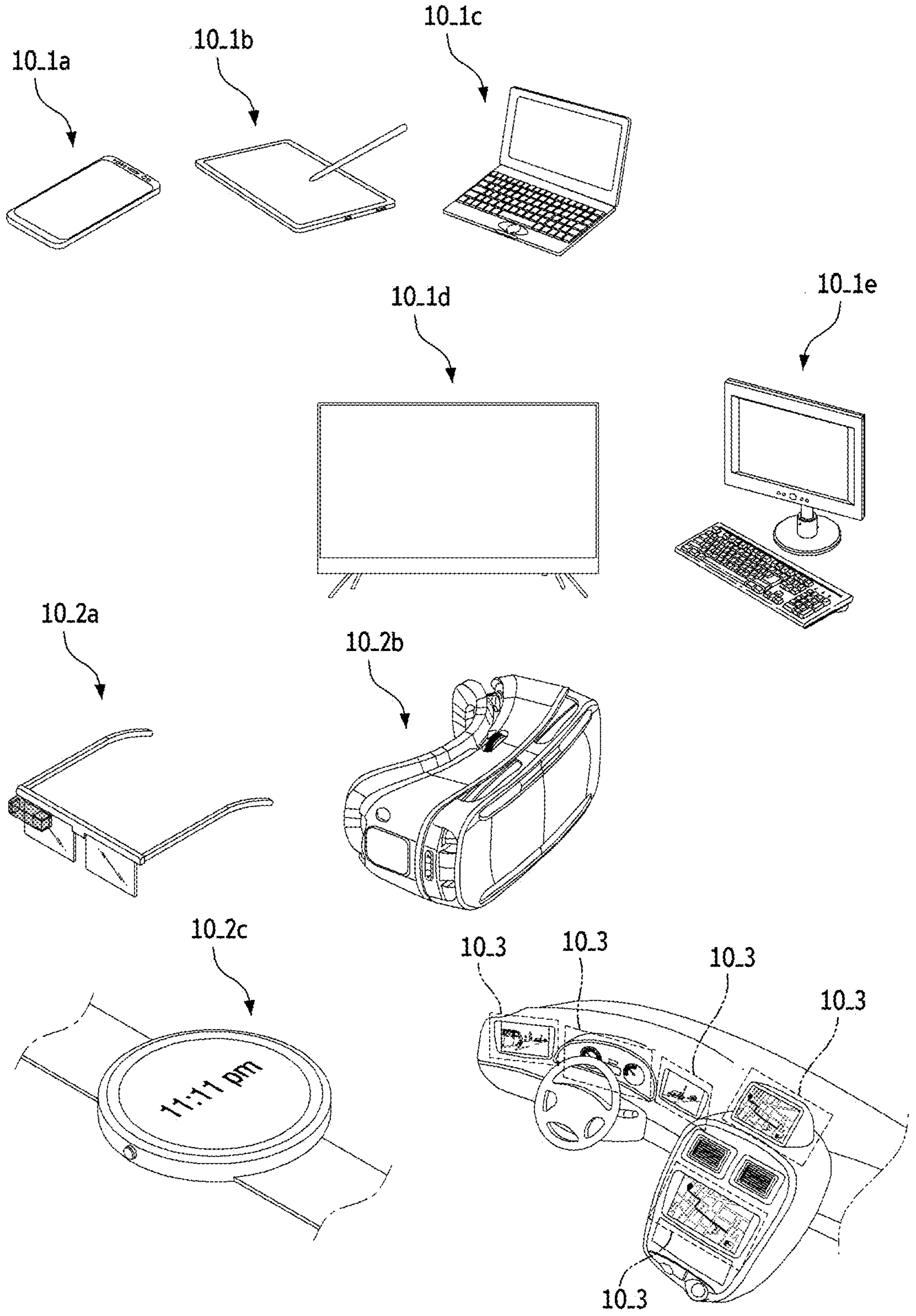
FIG. 14 is a schematic diagram of electronic devices according to various embodiments of the present disclosure.

FIG. 14 is a schematic diagram of electronic devices according to various embodiments of the present disclosure.

Referring to FIG. 14, various electronic devices to which display devices according to embodiments of the present disclosure are applied may include not only electronic devices such as, for example, a smartphone 10_1*a*, a tablet personal computer (PC) 10_1*b*, a laptop 10_1*c*, a TV 10_1*d*, and a desk monitor 10_1*e*, but also wearable electronic devices such as, for example, smart glasses 10_2*a*, a head mounted display (HMD) 10_2*b*, and a smartwatch 10_2*c*, and vehicle electronic devices 10_3 including display modules such as a Center Information Display (CID) and a room mirror display arranged on, for example, a dashboard and a center fascia of a vehicle such as an automobile.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A stereoscopic image display device, comprising:

a display panel configured to display an image;

an optical member including lenticular lenses, birefringent lenses, or liquid-crystal lenses, configured to refract an image display light emitted in a display area of the display panel and output the refracted image display light as a stereoscopic image display light;

a plurality of image sensors arranged in the display area, overlapping the optical member, and configured to capture front-side image data; and a main driver circuit configured to track a location of a user and/or a right eye position and a left eye position of the user by analyzing the front-side image data, and control a plurality of pixels in the display area to display right-eye image data and left-eye image data, wherein the main driver circuit is further configured to adjust viewing points of the right-eye image data and left-eye image data based on a result of tracking the user's location and/or the user's right eye position and left eye position, and drive the pixels to display a stereoscopic image corresponding to the adjusted viewing points.

2. The display device of claim 1, wherein the image sensors overlap some pixels among the plurality of pixels, and are disposed on a rear side of the overlapped some pixels.

3. The display device of claim 2, wherein the image sensors are built into a substrate of the display panel, inserted into grooves formed in the substrate, or arranged on a rear surface of the substrate, and wherein the overlapped some pixels are formed on a front surface of the substrate in an area corresponding to where the image sensors are built, inserted, or arranged.

4. The display device of claim 3, wherein the image sensors capture an image of a front side of the display panel, including light emitted by the pixels arranged in front of the image sensors, to generate the front-side image data, and wherein the main driver circuit analyzes the front-side image data by detecting an outline and an edge of the image of the front side of the display panel through comparative analysis of grayscale values and brightness values of the image of the front side of the display panel to determine the user's location and/or the user's right eye position and left eye position.

5. The display device of claim 3, wherein the optical member comprises:

a flat portion; and a plurality of stereoscopic lenses disposed on the flat portion, wherein the optical member is attached to a protective layer formed on a front side the display panel.

6. The display device of claim 5, wherein at least one stereoscopic lens among the plurality of stereoscopic lenses comprises:

a main hole configured to receive a built-in camera; and a plurality of subsidiary holes formed in front of the image sensors.

7. The display device of claim 5, wherein a rear surface of the flat portion of the optical member is attached to a front surface of the protective layer, and the plurality of stereoscopic lenses is disposed on a front surface of the flat portion of the optical member.

8. The display device of claim 7, wherein the plurality of stereoscopic lenses includes a plurality of birefringent materials configured to modify a linear polarization direction of the image display light passing through the stereoscopic lenses from a rear side of the stereoscopic lenses to a front side of the stereoscopic lenses.

9. The display device of claim 7, wherein the optical member further comprises:

a cover refractive layer formed on a front surface of the plurality of stereoscopic lenses and covering all of the plurality of stereoscopic lenses, and wherein the cover refractive layer is formed of a same inorganic material as the protective layer.

10. The display device of claim 9, wherein each of the protective layer and the cover refractive layer includes a plurality of birefringent materials configured to modify a linear polarization direction of the image display light passing through a rear side of the protective layer and a rear side of the cover refractive layer to a front side of the protective layer and a front side of the cover refractive layer.

11. The display device of claim 7, wherein a cover refractive layer of a same inorganic material as the protective layer is further formed on the front surface of the protective layer, and wherein the stereoscopic lenses are attached to a front surface of the cover refractive layer.

12. The display device of claim 11, wherein the plurality of stereoscopic lenses includes a plurality of birefringent materials configured to modify a linear polarization direction of the image display light passing through a rear side of the stereoscopic lenses to a front side of the stereoscopic lenses.

13. The display device of claim 11, wherein each of the protective layer and the cover refractive layer includes a plurality of birefringent materials configured to modify a linear polarization direction of the image display light passing through a rear side of the protective layer and a rear side of the cover refractive layer to a front side of the protective layer and a front side of the cover refractive layer.

14. The display device of claim 1, wherein the image sensors are built into a substrate of the display panel, inserted into grooves formed in the substrate, or arranged on a rear surface of the substrate.

15. The display device of claim 14, wherein the pixels are formed on a front surface of the substrate, and wherein the image sensors overlap some pixels among the plurality of pixels and are disposed on a rear side of the overlapped some pixels.

16. The display device of claim 15, wherein the image sensors capture an image of the front side of the display panel, including light emitted by the pixels arranged in front of the image sensors, to generate the front-side image data, and wherein the main driver circuit analyzes the front-side image data by detecting an outline and an edge of the image of the front side of the display panel through comparative analysis of grayscale values and brightness values of the image of the front side of the display panel to detect the user's location and/or the user's right eye position and left eye position.

17. The display device of claim 15, wherein the optical member comprises:

a flat portion; and a plurality of stereoscopic lenses disposed on the flat portion, wherein the optical member is attached to a protective layer formed on a front side the display panel.

18. A method of driving a stereoscopic image display device comprising a display panel configured to display an image and an optical member configured to refract an image display light emitted in a display area of the display panel and output the refracted image display light as a stereoscopic image display light, the optical member including lenticular lenses, birefringent lenses, or liquid-crystal lenses, the method comprising:

capturing an image on a front side of the display panel through a plurality of image sensors arranged in the display area and overlapping the optical member;

analyzing front-side image data generated through the image sensors to track a location of a user and/or a right eye position and a left eye position of the user; and controlling a plurality of pixels in the display area to display a right-eye image and a left-eye image, wherein controlling the pixels in the display area comprises adjusting viewing points of the right-eye image data and the left-eye image data based on a result of tracking the user's location and/or the user's right eye position and left eye position, and driving the pixels to display a stereoscopic image corresponding to the adjusted viewing points.

19. An electronic device including a stereoscopic image display device, wherein the stereoscopic image display device comprises:

a display panel configured to display an image;

an optical member including lenticular lenses, birefringent lenses, or liquid-crystal lenses, configured to refract an image display light emitted in a display area of the display panel and output the refracted image display light as a stereoscopic image display light;

a plurality of image sensors arranged in the display area, overlapping the optical member, and configured to capture front-side image data; and a main driver circuit configured to track a location of a user and/or a right eye position and a left eye position of the user, and control a plurality of pixels in the display area to display right-eye image data and left-eye image data, wherein the main driver circuit is further configured to adjust viewing points of the right-eye image data and the left-eye image data based on a result of tracking the user's location or the user's right eye position and left eye position, and drive the pixels to display a stereoscopic image corresponding to the adjusted viewing points.

20. The electronic device of claim 19, wherein the image sensors overlap some pixels among the plurality of pixels, and are disposed on a rear side of the overlapped some pixels.

* * * * *